March 29, 1966   V. CEPARANO ETAL   3,242,724
OIL FILM VIBRATION TABLE

Filed April 30, 1965   3 Sheets-Sheet 1

INVENTORS
VICTOR CEPARANO
MARVIN SCHNEE
BY
Lawrence S. Hallen
ATTORNEYS

March 29, 1966  V. CEPARANO ETAL  3,242,724
OIL FILM VIBRATION TABLE

Filed April 30, 1965  3 Sheets-Sheet 3

INVENTORS
VICTOR CEPARANO
MARVIN SCHNEE 333,242,724
OIL FILM VIBRATION TABLE
Victor Ceparano, Bellmore, and Marvin Schnee, East Rockaway, N.Y., assignors to the United States of America as represented by the Secretary of the Air Force
Filed Apr. 30, 1965, Ser. No. 453,565
13 Claims. (Cl. 73—71.6)

This is a continuation-in-part of application Serial No. 203,665, filed 19 June, 1962, and now abandoned.

This invention relates in general to vibration testing machines and, more particularly, to oil film vibration testing tables.

The high frequency vibrations encountered in guided missile and jet aircraft operation have presented new and critical design considerations. A growing necessity exists for subjecting all types and sizes of equipment to vibration testing to check dynamic behavior and fatigue resistance. Although, vibration testing is of long standing accepted practice, existing equipment is adapted only for the testing of relatively small specimens.

In addition to the desired vibration motion, present equipment produces certain moments, within the test speciment, which cause rotational and lateral motion across the axis of desired motion. The built-in moments and resulting resonances are objectionable because they have a modifying effect upon the vibration input, thereby complicating test results. In the smaller specimens, the comparatively large masses of the mountings and the vibration equipment tend to dampen and restrict the correspondingly small moments within acceptable limits. Since the moment of a solid is the product of mass multiplied by the distance between center of gravity and moment axis, it is readily seen that larger specimens would require huge, unwieldly testing equipment in order to provide the comparatively large mounting and equipment masses necessary for damping. In oil film vibration equipment, the specimen, mountings and vibration plate are all floated upon a thin film of oil. Since larger masses require heavier oil to support them, a weight restriction exists which limits the capabilities of this type of equipment and, furthermore, the equipment efficiency is limited by viscous drag friction of such heavier oils.

It is an object of this invention to provide vibration equipment capable of testing relatively large specimens.

Another object of this invention is to provide vibration equipment which minimizes and reduces the number and magnitude of moments and resonances causing rotational and cross-axis motion in a specimen.

Yet another object of this invention is to remove weight restriction limitations on oil film vibration equipment, and to improve the efficiency thereof.

A further object of the invention is to provide a simplified mounting of specimen upon the vibration equipment to permit a less complicated test having a cleaner response spectrum.

It is an object of this invention to insure true linear reciprocation of a desired direction for oil film vibration equipment.

Another object of this invention is to provide a vibration table with self-maintaining reciprocation guidance.

Other objects and a fuller understanding of the invention may be had by referring to the following description and claims taken in conjunction with the accompanying drawings in which:

Figure 1:
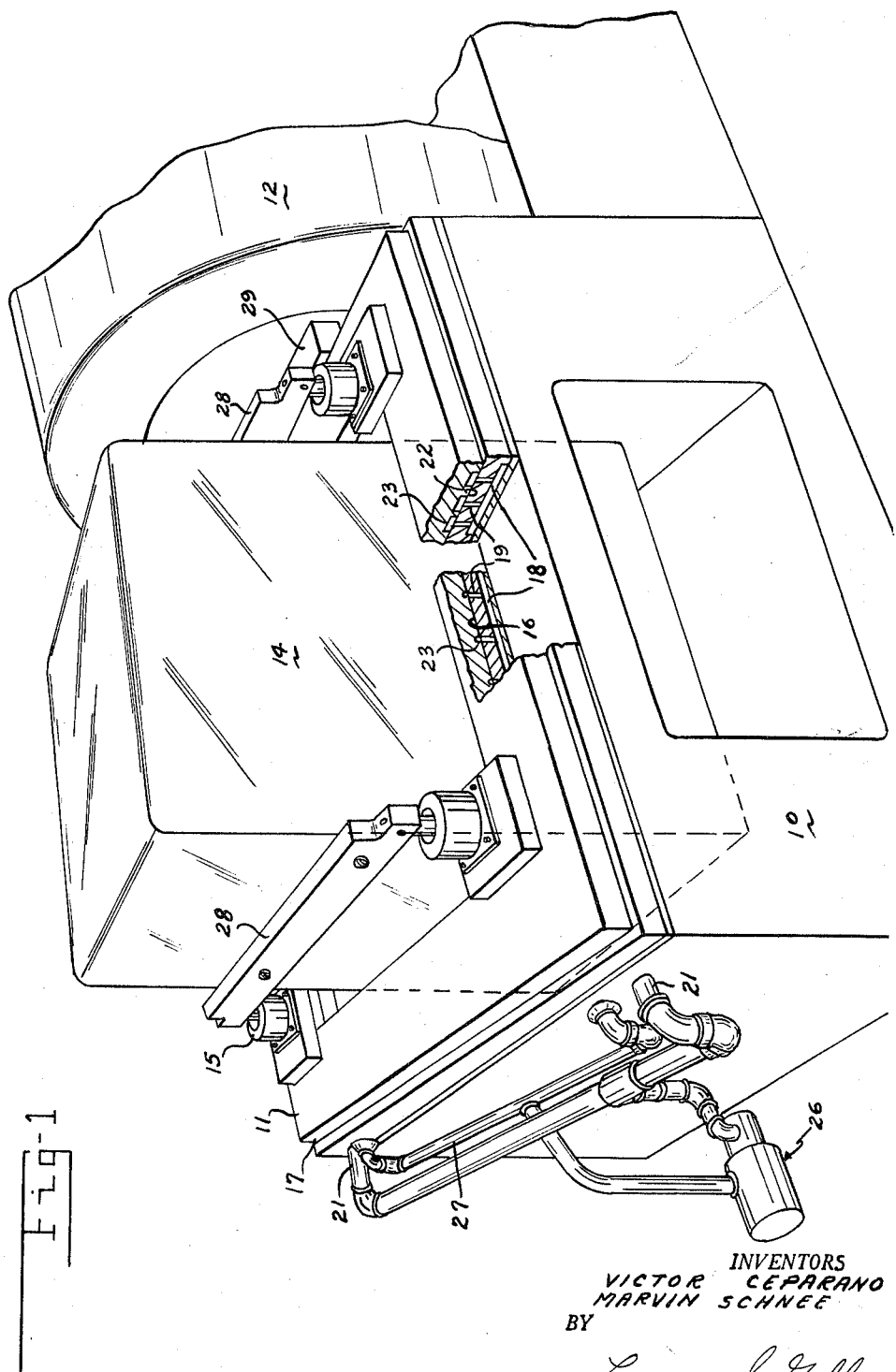
FIGURE 1 is a perspective view showing a test specimen mounted on an oil film vibration table incorporating the invention.

With reference to the drawings, the oil film vibration table of the invention comprises, in general, a stationary base 10 having a vibrator plate 11 slidably mounted upon the base for reciprocation by the vibration drive machine 12. Both the base and vibrator plate have their center portions removed to provide a well indicated generally at 13. Thus, in the manner illustrated, test specimen 14 may be secured to the vibrator plate 11 while partially received by well 13.

Stationary base 10 may be constructed of steel, concrete, or other material sufficient to provide a rigid, immovable structure, presenting a flat horizontal bed surface indicated at 16, and having a well portion 13 suitable to receive a test specimen 14. The rectangular shape shown for the vibration table, including the vibrator plate and the well opening was found to be the most practical, however, configuration need not necessarily be limited to such shape, since the primary consideration is the size and shape of test specimen portion contained to vibrate freely within the well 13. The flat horizontal bed surface 16 has been provided, in this instance, by flat bed plate 17 fixed to the base 10 in such manner to make it an immovable, integral part of the base. As illustrated, an opening corresponding to the well 13 is provided in bed plate 17. Supply channel 18, shown in section of FIGURE 1, extends through plate 17 beneath the bed surface 16, encompassing the opening to the well therein. A series of equally spaced feed passageways 19 are drilled through the bed face 16 to extend into the supply channel 18. Although supply channel 18 is illustrated as a single channel, a plurality of separate channels interconnecting the feed passageways 19 may be employed. Drain channel 20, cut into the bed surface 16, has an outlet connection at 21.

Figure 2:
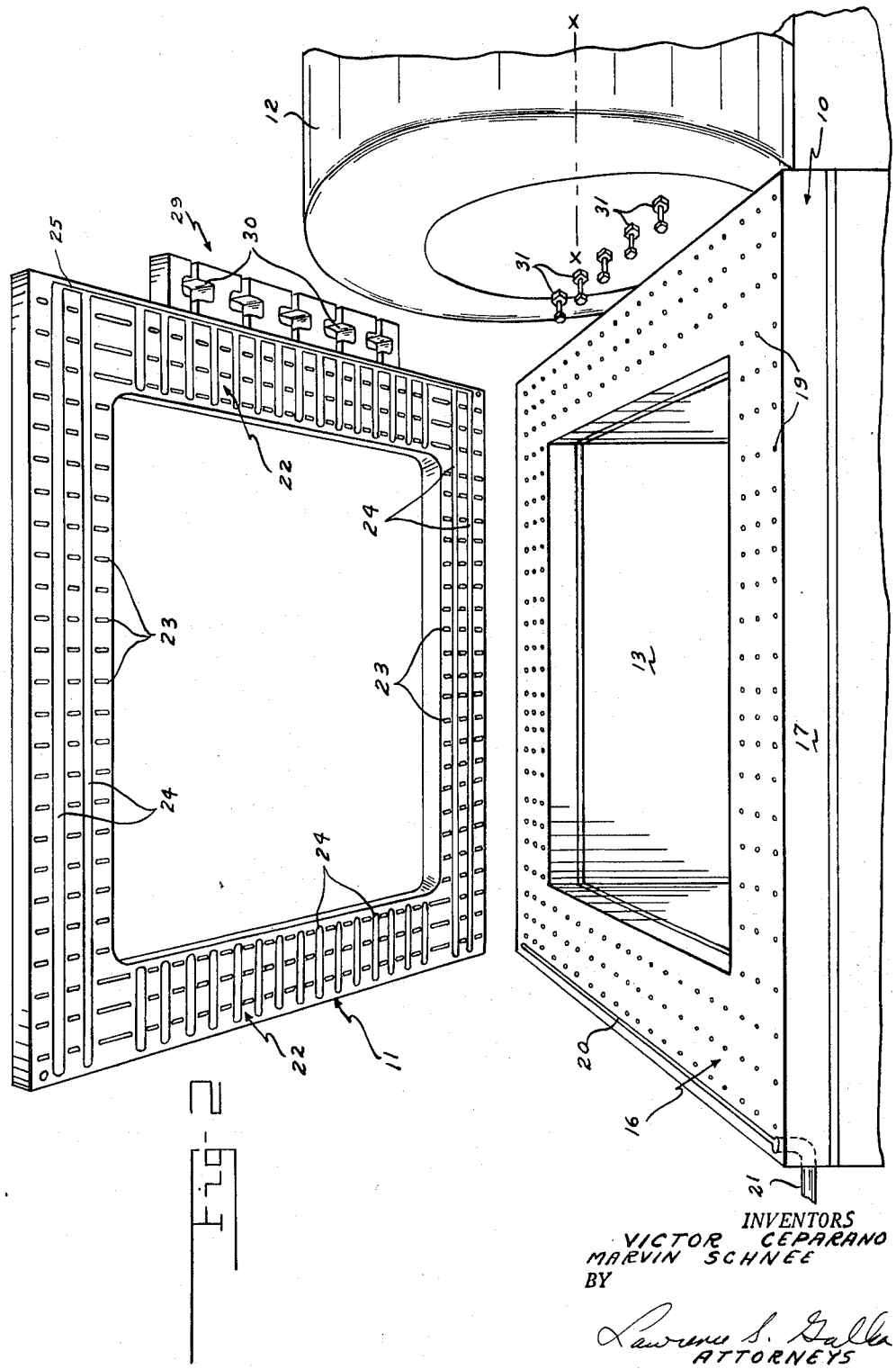
FIGURE 2 is an exploded perspective view showing details of the oil film vibration table.

The rectangular vibrator plate 11, a flat sheet having an opening corresponding with the well 13, is mounted to ride upon the bed plate 17 with surface 22 opposing the bed surface 16. A plurality of spaced recesses 23 are provided at the opposed surface 22, in open and opposed relationship to the feed passageways 19, as illustrated in the section of FIGURE 1. As illustrated in FIGURE 2, the recesses 23 are equally spaced and elongated in a direction transverse to the axis of vibration X—X. Bleeder channels 24 extend parallel to axis X—X between the rows of spaced recesses 23, and are interconnected by means of the transverse channel 25.

In an oil film vibration table, bearing means for supporting and floating the vibrator plate and specimen is provided by a film of oil. Note, however, that the configuration of a vibrator table having a specimen receiving well therein may be adapted for use with other types of bearing means, for instance, ball or roller bearings.

The bearing means of the preferred embodiment is a thin film of oil provided by a high pressure oil circulating system composed of a source of pressurized oil or pump 26, having an outlet communicating through pipes 27 to the supply channel 18 in bed plate 17. Pressurized oil circulates up through the feed passageways 19, into the opposed recesses 23, and between the opposed surfaces 16 and 22. Leakage is collected in the bleeder channels 24 and drained through the channel 20 to the input of the pump 26. Alternate design choices exist for draining bleeder channels 24 into pump 26 and thus completing the circuit. For example, in lieu of interconnecting transverse bleeder channel 25, an additional drain channel could be provided in surface 16.

Mounting means suitable to suspend and position a test specimen within the well 13 while rigidly affixed to the vibrator plate 11 is shown in FIGURE 1, wherein the speciment 14 is positioned and carried by mounting bars 28 rigidly connected to the vibrator plate 11 through the mounts 15. The mounting method chosen would be the type most suitable conforming to the size and shape of the test specimen.

Vibration drive machine 12, reciprocating in the direction of axis X—X, provides means to vibrate the vibrator plate. Reciprocal motion is transferred from the vibration drive machine 12 to the vibrator plate 11 through the drive bar 29, which is affixed to the vibrator plate. Drive bar 29 has slots 30 adapted to receive the drive studs 31 in such manner that, when the plate 11 of FIGURE 2 is lowered into position, a connection is accomplished which transmits motion parallel to axis X—X, but does not transmit any lateral motions which may be generated by the vibration machine 12.

In operation, test specimen 14 is mounted and affixed to the vibrator plate 11 in position whereby the specimen center of gravity coincides with the horizontal plane of the vibrator plate. The specimen bottom portion extends downward within the well 13 and is free to vibrate therein without interference. Pump 26 supplies pressurized oil through the outlet pipe 27 into supply channel 18. The pressure is sufficient to force the oil upward through the feed passageways 19 into the recesses 23 and between the opposed surfaces 16 and 22 and thereby float the vibrator plate, specimen and mounting. Oil leaking between the opposed surfaces 16, 22 is collected by bleeder channels 24 and drained through channel 20 into the inlet 21. Vibration drive motor 12 generates vibration in the direction of axis X—X of sufficient magnitude to be transmitted through drive bar 29 to the vibrator plate 11.

Whereas vibration is supplied in a horizontal plane through the center of gravity of the specimen 14, moments causing rotational or cross axis motion will be minimized and the number and magnitude of the built-in resonances will be reduced. Thus, the mountings required to clamp specimens to the table are simplified permitting a less complicated test having a cleaner response spectrum. In addition, by virtue of the invention's hydraulic oil film arrangement, self-lubrication and automatic lifting are achieved, effectively removing any weight restriction and permitting the use of lighter oil to decrease the amount of viscous drag friction and thereby increase efficiency of the vibration table.

Figure 3:
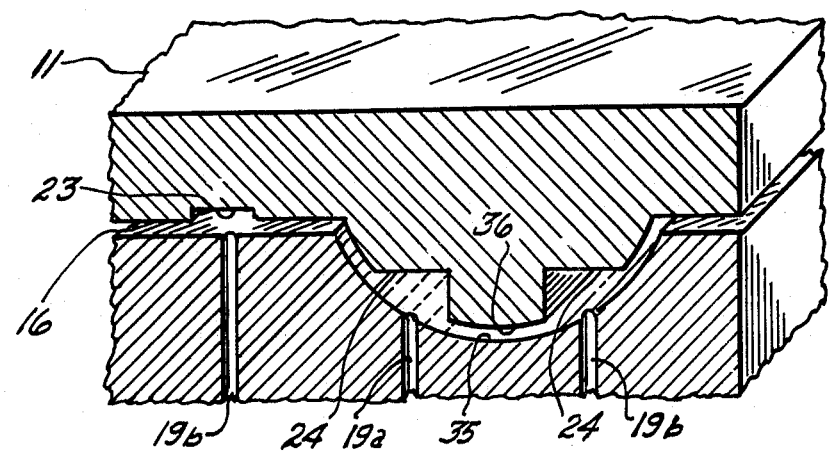
FIGURE 3 is a section of the linear guide means of this invention.

A preferred embodiment of this invention is shown in FIGURE 3. Experience has shown that it is not always possible to mount a specimen at the exact center of gravity and further, balance imperfections may exist in the equipment. An improvement which insures true linear reciprocation in the desired direction is the provision of a pair of grooves 35 to lineally extend across surface 16 in a direction paralleling the axis X—X of shaker motor 12. The grooves are of arcuate cross section and have a row of feed passageways 19a lineally extending along the groove center and bottom portion similar to those disclosed in connection with FIGURE 2. Grooves 35 correspond to the pair of lineal guide rails 36, thus also of arcuate cross section, and receive the rails to guide reciprocation thereof in a direction paralleling the axis of vibration X—X. Bleeder channels 24 extend parallel to axis X—X and are positioned between the rows of spaced recesses 23. Vibration testing lineal guidance is afforded by rails 36, affixed to form an integral part of plate 11. Rails 36 also include bleeder channels 24, as well as spaced recesses 23 which are in open and opposed relationship to the feed passageways 19a and 19b. Feed passageways 19a and 19b, symmetrically spaced under rails 36, provide an even hydraulic, self-centering force to float the rails 36 within grooves 35. Thus, the rails 36 together with vibrator plate 11 and associated specimen thereon may easily reciprocate longitudinally along and within grooves 36, while vibrations of another direction are effectively limited.

Although the invention has ben described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A specimen vibration testing machine comprising: a stationary base having a speciment receiving well therein; a vibrator plate mounted in a horizontal plane on said base, said plate having an opening corresponding with said well; mounting means on said vibrator plate for securing thereon a test speciment within said well with center of gravity at said horizontal plane; and means to vibrate said plate in said horizontal plane.

2. A specimen vibration testing machine comprising: a stationary base having a specimen receiving well therein; a vibrator plate; a bearing means on said base for supporting and floating said plate in a horizontal plane over said well, said plate having an opening corresponding with said well; mounting means on said vibrator plate for securing thereon a test speciment within said well with center of gravity at said horizontal plane; and means to vibrate said plate in said horizontal plane.

3. A specimen vibration testing machine comprising: a stationary base providing a bed having a specimen receiving well therein; a vibrator plate mounted in a horizontal plane on said bed, said bed and said plate having opposed surfaces therebetween and said plate having an opening corresponding with said well; mounting means on said vibrator plate for securing thereon a test specimen within said well with center of gravity at said horizontal plane; an oil pressure source; a conduit connected to said source and opening onto said surfaces to provide an oil film between said surfaces suitable to float said plate thereupon; and means to horizontally reciprocate said plate.

4. A specimen vibration testing machine as set forth in claim 3 including linear guidance means for said vibrator plate.

5. A specimen vibration testing machine as set forth in claim 4, wherein said linear guidance means comprises a rail of arcuate cross section affixed to said plate and a corresponding groove receiving said rail provided by said bed.

6. A specimen vibration testing machine as set forth in claim 4, wherein said linear guidance means comprises a pair of spaced parallel rails having arcuate cross section affixed to said plate and said bed providing a pair of corresponding grooves receiving said rails.

7. A specimen vibration testing machine comprising in combination; a stationary base having a specimen receiving well therein; a vibrator plate mounted on said base, said base and plate having opposed surfaces therebetween, said base having a plurality of spaced oil feed passageways opening onto said surfaces and said vibrator plate having an opening corresponding with said well and a plurality of spaced recesses open and opposed to said passageways; a source of pressurized oil communicating with said passageways and forcing oil into said recesses and between said surfaces to float said vibrator plate in a horizontal plane upon an oil film; mounting means on said vibrator plate for securing thereon a test speciment within said well with center of gravity at said horizontal plane; and means to reciprocate said vibrator plate in said horizontal plane.

8. A specimen vibration testing machine comprising in combination; a stationary base providing a bed and specimen receiving well therein; a vibrator plate mounted on said bed, said bed and said plate having opposed surfaces therebetween, said plate having an opening therein corresponding with said well, said base having an oil supply channel communicating with a plurality of spaced oil feed passageways passing through said bed and opening onto said surfaces and said vibrator plate having a plurality of spaced recesses open and opposed to said passageways; a source of high pressure oil connected to said channel, forcing oil into said recesses and between said surfaces to float said vibrator plate in a horizontal plane upon an oil film, means on said vibrator plate to secure a test specimen within said well with center of gravity at said horizontal plane; and means to reciprocate said vibrator plate in said horizontal plane.

9. A specimen vibration testing machine as set forth in claim 8 including linear guidance means for said vibrator plate.

10. A specimen vibration testing machine as set forth in claim 9, wherein said linear guidance means comprises a rail of arcuate cross section affixed to said plate and a corresponding groove receiving said rail provided by said bed.

11. A specimen vibration testing machine as set forth in claim 9, wherein said linear guidance means comprises a pair of spaced parallel rails having arcuate cross section affixed to said plate and said bed providing a pair of corresponding grooves receiving said rails.

12. A specimen vibration testing machine comprising in combination: a stationary base having a specimen receiving well therein; a bed plate affixed to said base; a vibrator plate mounted on said bed plate, said plates having opposed surfaces therebetween and openings therein corresponding with said well, said bed plate having an oil supply channel and a plurality of spaced oil feed passageways leading from said channel to said surfaces and said vibrator plate having a plurality of spaced recesses open and opposed to said passageways; a source of high pressure oil connected to said channels forcing oil into said recesses and between said surfaces to float said vibrator plate in a horizontal plane upon an oil film; means on said vibrator plate for securing a test specimen at a position within said well with center of gravity at said horizontal plane; and means to reciprocate said vibrator plate in said horizontal plane.

13. A specimen vibration testing machine comprising in combination: a stationary base having a specimen receiving well therein; a flat bed plate affixed to said base; a flat vibrator plate mounted on said bed plate, said bed and vibrator plates having opposed surfaces therebetween and openings therein corresponding with said well, said bed plate having an oil supply channel and a plurality of spaced oil feed passageways leading from said channel to said surfaces and said vibrator plate having a plurality of spaced recesses open and opposed to said passageways; a high pressure oil circulating system having a source of pressurized oil communicating through said supply channel to said passageways for forcing oil upward into said recesses and between said surfaces to float said vibrator plate in a horizontal plane upon an oil film, said vibrator plate providing a plurality of spaced interconnected bleeder channels at said surface, and said bed plate providing a drain channel connecting said bleeder channels and said source to return oil leaking between said surfaces into said bleeder channels, back to said source; mounting means on said vibrator plate for securing a test specimen within said well with center of gravity at said horizontal plane; and a shaker motor connected to said vibrator plate to provide reciprocation thereof in said horizontal plane.

References Cited by the Examiner

UNITED STATES PATENTS

| | | | |
|---|---|---|---|
| 2,788,862 | 4/1957 | Langer | 308—9 X |
| 2,862,385 | 12/1958 | Woods | 73—71.6 |
| 2,877,538 | 3/1959 | Conlon. | |
| 2,942,385 | 6/1960 | Pal | 308—9 X |
| 3,142,172 | 7/1964 | Taccogna | 73—71.6 |
| 3,164,984 | 1/1965 | Gertel | 73—71.6 |

FOREIGN PATENTS

| | | |
|---|---|---|
| 1,230,193 | 3/1960 | France. |

RICHARD C. QUEISSER, *Primary Examiner.*

JOHN P. BEAUCHAMP, *Examiner.*